UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

METHOD OF PRODUCING SOLID MIXED CHLORIDES OF MAGNESIUM AND CALCIUM IN DIVIDED FORM

No Drawing. Application filed November 5, 1928. Serial No. 317,495.

The present invention is concerned with the production of mixed chlorides of magnesium and calcium in divided form, particularly in the form of flakes made by chilling a solution of said chlorides upon a cooled surface and removing the solidified chlorides therefrom.

Calcium chloride may be readily flaked upon an internally water cooled revolving drum dipping in a concentrated solution of said chloride, a thin coating of the solid chloride being formed on the surface of the drum which may be scraped therefrom with a suitable knife or scraper to form a flaked product. In this case the temperature of solidification is such that a satisfactory rate of working may be experienced at all seasons of the year with avaliable natural cooling waters. When, however, it is attempted to proceed in the same manner with a mixed solution containing magnesium and calcium chlorides, it is found that the temperature of solidification will in many cases be too low to permit solidification by the use of natural cooling waters at all seasons, or will slow down the rate of working to a disadvantageous degree. I am not aware that magnesium chloride-calcium chloride solutions have been successfully flaked heretofore, or that a flaked mixed chloride has been made.

I have discovered a method by which the temperature of solidification of such mixed solutions may be raised to such an extent that flaking may be practiced successfully and cheaply in a somewhat similar manner to the flaking of straight calcium chloride.

To the accomplishment of the foregoing and related ends, the invention, then, consists of the method hereinafter fully described and particularly pointed out in the claims, the following description setting forth in detail several modes of procedure embodying my invention, such disclosed modes constituting, however, but several of the various ways in which the principle of the invention may be used.

Starting with a parent solution having any composition ratio of calcium chloride-magnesium chloride-water, my method of producing a flake material with all of it or a portion thereof may be practiced as follows, to wit:—

Concentrate the parent solution to its saturated atmospheric boiling point and continue concentration at its atmospheric boiling point with salting out of the crystals and with rise of boiling temperature until the temperature of solidification of the mixture or slurry of crystals and concentrated mother liquor is raised sufficiently to leave a suitable heat head above cooling agent temperature. If the resulting slurry, before reaching such solidification temperature, is too thick to pump or otherwise handle to the flaking step, it will be necessary to separate a sufficient portion of the crystals from the slurry to keep it of a handling consistency when such proper point is reached. Any so derived mother liquor which has a solidification temperature well above the temperature of the available cooling agent may be flaked on the ordinary type of flaker heretofore used for straight $CaCl_2$. For those parent solutions in which the ratio

$$\frac{MgCl_2}{CaCl_2}$$

is either high or low the slurry is readily flaked without elimination of part of the crystallized salts.

It is possible in most cases to flake all of the parent concentrated solution without separation of a part of it as hydrated crystals, although slurries derived from parent solutions in which the ratio

$$\frac{MgCl_2}{CaCl_2}$$

is within a certain intermediate range will have a solidification temperature requiring either super-cooling or a reduced rate of flaking, if using natural cooling means. Those parent solutions which may have the temperature of solidification so raised without the necessity of removing a portion of the hydrated crystals to keep the resulting slurry of handling consistency will be most easily and rapidly flaked, since the solidification temperature of the mother liquors will be high.

The slurry may be supplied to the pan in which the flaker drum dips or it may be fed on to the drum through a suitable distributing trough or equivalent device adapted to spread it in a thin layer thereon.

It is possible to concentrate the solution at pressures either above or below the atmospheric pressure, when the said composition ratio is high or low, but operation at atmospheric pressure is preferable, particularly if the slurry is to be flaked. It is preferable to concentrate at pressures greater than atmospheric from the standpoint of obtaining a high freezing point mother liquor before a crystal slurry too thick to pump results. Proceeding in the latter way, however, the flaking of the slurry is more difficult at atmospheric pressure, since flash evaporation occurs upon release of the slurry to atmospheric pressure, causing it to cool and become thick. In some cases where nearly pure $MgCl_2$ or $CaCl_2$ is produced the concentration to form a slurry may be done under low vacuum and a flakable slurry obtained. However, all things considered, working at atmospheric pressure is preferable when flaking is to be done. If, however, the mixed chlorides are to be granulated by other means and self evaporation of water from the surface layers of the particles is to be secured, then the concentration to a slurry under pressure permits mixed chlorides of intermediate ratios to be more easily produced.

With parent solutions having a composition ratio corresponding to tachydrite crystal composition ($CaCl_2.2MgCl_2.12H_2O$), no change in the composition ratio of the mother liquor may be expected to occur by concentration at atmospheric pressure. The same limitation applies to a parent solution having a composition ratio $$\frac{MgCl_2}{CaCl_2} = \frac{26}{74}.$$

Concentration of such a solution at atmospheric pressure results in salting out mixed double hydrated salts without alteration of mother liquor composition.

The chloride content of the product may, however, be raised by producing a slurry of hydrated salt crystals and mother liquor in all cases, and the choice of the method of solidification and division of the resulting solid chlorides will depend upon the temperature of solidification and the mechanical handling characteristics of the slurry so obtained.

In order to work up mixed chloride solutions of all ratios into flaked products comprising mixed solid chlorides, the following procedures may be followed.

With parent solutions having a composition ratio $\frac{MgCl_2}{CaCl_2}$ less than $\frac{2}{1}$ (molecular ratio) and not directly flakable as derived slurry, the preferred procedure will be to first concentrate said solution at reduced pressure to salt out tachydrite crystals. Such tachydrite will then be separated from the mother liquor and washed to remove a portion of the $CaCl_2$ and leave a mass of crystals having a composition ratio sufficiently high in $MgCl_2$ to permit flaking when converted into a slurry by melting said crystal mass and concentrating at atmospheric pressure, preferably, as described. The tachydrite mother liquor and the wash water from the tachydrite crystals will be recycled through the reduced pressure concentrating step to build up a mother liquor composition permitting deflecting same to the slurry flaking procedure, said mother liquor having preferably a composition high in $CaCl_2$, e. g. 6 to 10 parts $MgCl_2$ to 100 parts $CaCl_2$.

With parent solutions having a composition ratio $\frac{MgCl_2}{CaCl_2}$ greater than $\frac{2}{1}$, and not directly flakable as a derived slurry, a preferred procedure will be to concentrate at reduced pressure to salt out tachydrite crystals, recycling the mother liquor and separating the tachydrite. The latter will then be treated by washing as above described and the melted crystal residue, high in $MgCl_2$, will be concentrated to slurry and flaked. The wash water in which the ratio $\frac{MgCl_2}{CaCl_2}$ is less than $\frac{2}{1}$ will then be treated as described above for such solution. The recycled mother liquor will be built up to a concentration permitting deflection to the melted crystal residue for concentrating to a slurry and flaking.

In this manner such parent solutions may be reduced to two portions, one high in $MgCl_2$, the other high in $CaCl_2$ and each sufficiently high to permit flaking a slurry derived therefrom, such separation into two portions being, of course, restricted to those intermediate solution composition ratios which will not satisfactorily flake as a slurry directly without a change in ratio being first effected.

The herein disclosed method is then generally applicable to flaking mixed $MgCl_2$—$CaCl_2$ solutions of all composition ratios, directly, provided the solidification temperature exhibited by a slurry derived therefrom is such as to enable cooling to that temperature with available cooling means, and indirectly, after preliminary parting into two portions as described.

Where natural or other brines are worked for $CaCl_2$ and $MgCl_2$ by fractional recrystallization methods involving the precipitation of tachydrite crystals, a mother liquor is normally obtained in which the ratio of $\frac{MgCl_2}{CaCl_2}$ ranges between $\frac{6}{100}$ and $\frac{10}{100}$, such a mother liquor supplying a parent solution admirably adapted to working by the herein disclosed method.

For example, if it be desired to produce a mixed flaked magnesium chloride-calcium chloride product containing the chlorides in the ratio of from 6 to 10 parts of the former to 100 of the latter, a saturated solution of said chlorides is concentrated at atmospheric pressure to form a slurry of crystals of $2CaCl_2.MgCl_2.6H_2O$ and a mother liquor nearly free of magnesium chloride (if desired). Such mother liquor will have a high solidification temperature and the hot slurry of the said crystals and mother liquor will be still sufficiently fluid to be handled readily to a flaker drum and will promptly solidify thereon to a firm coating which may be flaked by scraping from the drum in the same manner and using the same available cooling waters as practiced heretofore with straight $CaCl_2$ solutions.

My method of preparing mixed chloride solution for flaking may obviously be used in preparing such solution for solidification and forming into particles by any other method of procedure involving cooling and division. Such preparation secures the advantages of high and sharp solidification temperatures.

The flaked form of product has been found to be a very desirable form in which to market hygroscopic chlorides, and my invention accordingly constitutes a valuable advance in the art of flaking mixed hygroscopic chlorides, permitting for the first time the production of mixed chlorides in the form of flakes in a cheap and satisfactory manner.

Other modes of applying the principle of my invention may be employed instead of those explained, change being made as regards the methods employed, provided the step or steps stated by any of the following claims or the equivalent of such stated step or steps be employed.

I therefore particularly point out and distinctly claim as my invention:—

1. In a method of producing flaked solid mixed chlorides of calcium and magnesium from a solution thereof, the step which consists in concentrating such solution to form therefrom a slurry of chloride crystals and mother liquor thereof.

2. In a method of producing flaked solid mixed chlorides of calcium and magnesium from a solution thereof, the steps which consist in concentrating such solution to form therefrom a slurry of chloride crystals and mother liquor thereof, and then cooling said slurry on a flaker to complete solidification.

3. In a method of producing flaked solid mixed chlorides of calcium and magnesium from a solution thereof, the steps which consist in concentrating such solution to form therefrom a slurry of chloride crystals and mother liquor thereof, removing a portion of said crystals, concentrating further and then flaking a slurry of said crystals and final mother liquor.

4. In a method of producing solid mixed hydrated chlorides of calcium and magnesium in divided form, the steps which consist in concentrating a saturated solution thereof to salt out mixed chloride crystals and form a slurry of such crystals and a mother liquor consisting largely of a solution of one such chloride and then solidifying said slurry in the form of discrete particles.

5. In a method of producing solid mixed hydrated chlorides of calcium and magnesium in divided form, the steps which consist in concentrating a saturated solution thereof to salt out mixed chloride crystals and form a slurry of such crystals and a mother liquor consisting largely of a solution of one such chloride and then flaking said slurry.

6. In a method of producing solid mixed hydrated chlorides of calcium and magnesium, the steps which consist in concentrating a saturated solution thereof to salt out mixed chloride crystals and form a mother liquor consisting largely of a solution of one such chloride, removing a portion of such crystals, thereby leaving a slurry of the remaining crystals and mother liquor capable of being pumped by usual means, and solidifying such slurry in the form of discrete particles.

7. In a method of producing solid mixed hydrated chlorides of calcium and magnesium, the steps which consist in concentrating a saturated solution thereof to salt out mixed chloride crystals and form a mother liquor consisting largely of a solution of one such chloride, removing a portion of such crystals, thereby leaving a slurry of the remaining crystals and mother liquor capable of being pumped by usual means, and flaking such slurry.

8. The method of preparing mixed hydrated chlorides of calcium and magnesium in divided form from mixed solutions of said salts which comprises concentrating the solution under reduced pressure to salt out tachydrite crystals, separating such crystals, further concentrating the residual solution at atmospheric pressure to salt out mixed chloride crystals and form a slurry of such crystals and a mother liquor consisting substantially of a solution of calcium chloride and solidifying said slurry in the form of discrete particles.

9. The method of preparing mixed hydrated chlorides of calcium and magnesium in divided form from mixed solutions of said salts which comprises concentrating the solution under reduced pressure to salt out tachydrite crystals, separating such crystals, further concentrating the residual solution at atmospheric pressure to salt out mixed chloride crystals and form a slurry of such crystals and a mother liquor consisting substantially of a solution of calcium chloride and flaking said slurry.

10. The method of working up the residual liquor resulting from the crystallization of tachydrite which comprises concentrating the liquor at atmospheric pressure to salt out mixed crystals of calcium chloride and magnesium chloride and form a slurry of such crystals and mother liquor consisting substantially of a solution of calcium chloride and solidifying said slurry in the form of discrete particles.

11. The method of working up the residual liquor resulting from the crystallization of tachydrite which comprises concentrating the liquor at atmospheric pressure to salt out mixed crystals of calcium chloride and magnesium chloride and form a slurry of such crystals and mother liquor consisting substantially of a solution of calcium chloride and flaking said slurry.

Signed by me this 1st day of November, 1928.

SHELDON B. HEATH.